(12) United States Patent
Lee et al.

(10) Patent No.: US 10,704,703 B2
(45) Date of Patent: Jul. 7, 2020

(54) COOLANT CONTROL VALVE UNIT

(71) Applicants: Hyundai Motor Company, Seoul (KR); Kia Motors Corporation, Seoul (KR)

(72) Inventors: Hyo Jo Lee, Gyeonggi-do (KR); Yonggyu Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 193 days.

(21) Appl. No.: 15/834,762

(22) Filed: Dec. 7, 2017

(65) Prior Publication Data
US 2019/0085997 A1    Mar. 21, 2019

(30) Foreign Application Priority Data
Sep. 21, 2017   (KR) ......................... 10-2017-0121902

(51) Int. Cl.
*F16K 31/04* (2006.01)
*F16K 31/524* (2006.01)
*F01P 7/16* (2006.01)
*F16K 1/54* (2006.01)
*F01P 7/14* (2006.01)

(52) U.S. Cl.
CPC .............. *F16K 31/047* (2013.01); *F01P 7/16* (2013.01); *F16K 1/54* (2013.01); *F16K 31/5245* (2013.01); *F01P 2007/146* (2013.01)

(58) Field of Classification Search
CPC ........ F01P 7/16; F01P 2007/143; F01P 7/167; F16K 31/52416; F16K 31/52; F16K 31/521; F16K 31/152; F16K 31/52408
See application file for complete search history.

(56) References Cited

U.S. PATENT DOCUMENTS

| 5,067,359 | A | * | 11/1991 | Flaig | ................ | A61M 39/28 251/129.11 |
| 8,701,603 | B2 | * | 4/2014 | Warnery | ............... | F01P 7/167 123/41.08 |
| 2016/0097444 | A1 | * | 4/2016 | Nashery | ................ | F16H 53/02 251/251 |

FOREIGN PATENT DOCUMENTS

KR    10-2010-0117909 A    7/2012

\* cited by examiner

*Primary Examiner* — Angelisa L. Hicks
(74) *Attorney, Agent, or Firm* — Mintz Levin Cohn Ferris Glovsky and Popeo, P.C.; Peter F. Corless

(57) ABSTRACT

A coolant control valve unit is provided. The valve unit includes a valve that opens and closes a coolant path and a rod that is extended from one side of the valve. A cam is also provided which includes a track formed with a predetermined inclination and a predetermined height along a rotation direction with respect to a rotation axis. The track thus presses the rod according to the rotation of the cam which is rotated about the rotation axis by and an actuator.

10 Claims, 5 Drawing Sheets

COOLANT CONTROL VALVE UNIT

CROSS-REFERENCE TO RELATED APPLICATION

This application claims priority to and the benefit of Korean Patent Application No. 10-2017-0121902 filed on Sep. 21, 2017, the entire contents of which are incorporated herein by reference.

BACKGROUND

(a) Field of the Invention

The present invention relates to a valve unit, and more particularly, to a coolant control valve unit that adjusts an opening degree of at least two coolant paths using one cam, and of which operation durability and stability may be improved.

(b) Description of the Related Art

As is generally known, an engine generates torque from combustion of fuel, and remaining energy from the combustion of the fuel is exhausted as heat energy. Particularly, a coolant absorbs heat energy while circulating through the engine, and emits the absorbed heat energy to the outside through a radiator. In general, when a temperature of the coolant of the engine is low, viscosity of oil may increase to cause an increase of a frictional force, an increase of fuel consumption, and a deterioration of exhaust gas.

In addition, when the engine temperature is excessively high, and ignition timing may be adjusted to suppress generation of knocking, thereby causing deterioration of engine performance. When the temperature of the lubricant is too high, a lubricating operation may be degraded. Thus, multiple coolant control valves are applied to control several cooling elements through a single valve unit to maintain the temperature of the coolant in a particular portion to be high and to maintain the temperature of the coolant in another portion to be low.

As an example of a conventional art, a coolant control valve unit includes a motor that provides torque, a cam that rotates about a rotational axis by the motor and where a track having a predetermined profile is formed in one side thereof, a rod that moves by the track based on rotation of the cam, and a valve disposed in the rod to open and close the coolant path. Therefore, the track and the rod of the cam slide while being closely attached by an elastic member, and the rod is worn out as a use time period is increased, thereby causing the length of the rod to be decreased. Accordingly, a structure capable of reducing abrasion of a valve rod caused by a track of a cam and stably support the cam is being researched and developed.

The above information disclosed in this section is merely for enhancement of understanding of the background of the invention and therefore it may contain information that does not form the prior art that is already known in this country to a person of ordinary skill in the art.

SUMMARY

The present invention provides a coolant control valve unit capable of reducing friction and abrasion between a rod where a valve is formed and a track of a cam, and more accurately adjusting an opening degree of a coolant valve by a valve even through abrasion occurs.

A coolant control valve unit according to an exemplary embodiment of the present invention may include: a valve configured to open or close a coolant path; a rod extended from a first side of the valve; a cam where a track is formed with a predetermined inclination and a predetermined height along a rotation direction with respect to a rotation axis, wherein the track presses the rod according to the rotation; and an actuator configured to rotate the cam about the rotation axis, wherein while the coolant path is closed by the valve, a predetermined gap is formed between the track and the rod.

As the predetermined gap is formed between the track and the rod, abrasion of the rod may be reduced. The coolant control valve unit may further include an axle integrally formed with the cam and configured to receive torque from the actuator. The coolant control valve unit may further include: an upper member through which the rod penetrates; a plate engaged to a bottom side of the cam; and a cam elastic member configured to maintain a predetermined gap between the plate and the bottom side of the cam by being disposed between the plate and the bottom side of the cam.

The coolant control valve unit may further include: a middle member disposed in a lower side of the upper member and where the coolant path is formed; a valve elastic member that supports the bottom side of the valve; and a holder that supports a lower end of the valve elastic member. A plurality of clips formed at opposite ends of the plate may be inserted into a clip groove formed in the bottom side of the cam. A protrusion may be formed at a corresponding location of the rotational axis in the bottom side of the plate, and a protrusion groove where the protrusion may be received in formed in the upper member. An insertion groove may be formed corresponding to the rotational axis in the bottom side of the cam, and an insertion member may be inserted into the insertion groove.

While the coolant path is closed by the valve, an interior diameter of the coolant path may be gradually decreased toward the track to prevent further movement toward the track of the valve. An exterior diameter of the valve may be gradually decreased toward the track corresponding to the shape of the coolant path. The coolant control valve unit may further include a sealing member disposed between the valve and the coolant path.

According to the exemplary embodiment of the present invention, a predetermined gap may be maintained between the track of the cam and the rod while the coolant path is completely closed by the valve, thereby reducing friction and abrasion of the rod. In addition, the plate may be disposed between the cam and a plane of a housing, and a cam elastic member may be disposed between the plate and the cam to more stably support the cam. Further, the plate may be more stably engaged to the housing and the cam using a groove and clips formed in the plate.

BRIEF DESCRIPTION OF THE DRAWINGS

The above and other aspects, features and advantages of the present invention will be more apparent from the following detailed description taken in conjunction with the accompanying drawings, in which.

DESCRIPTION OF SYMBOLS

Figure 1:
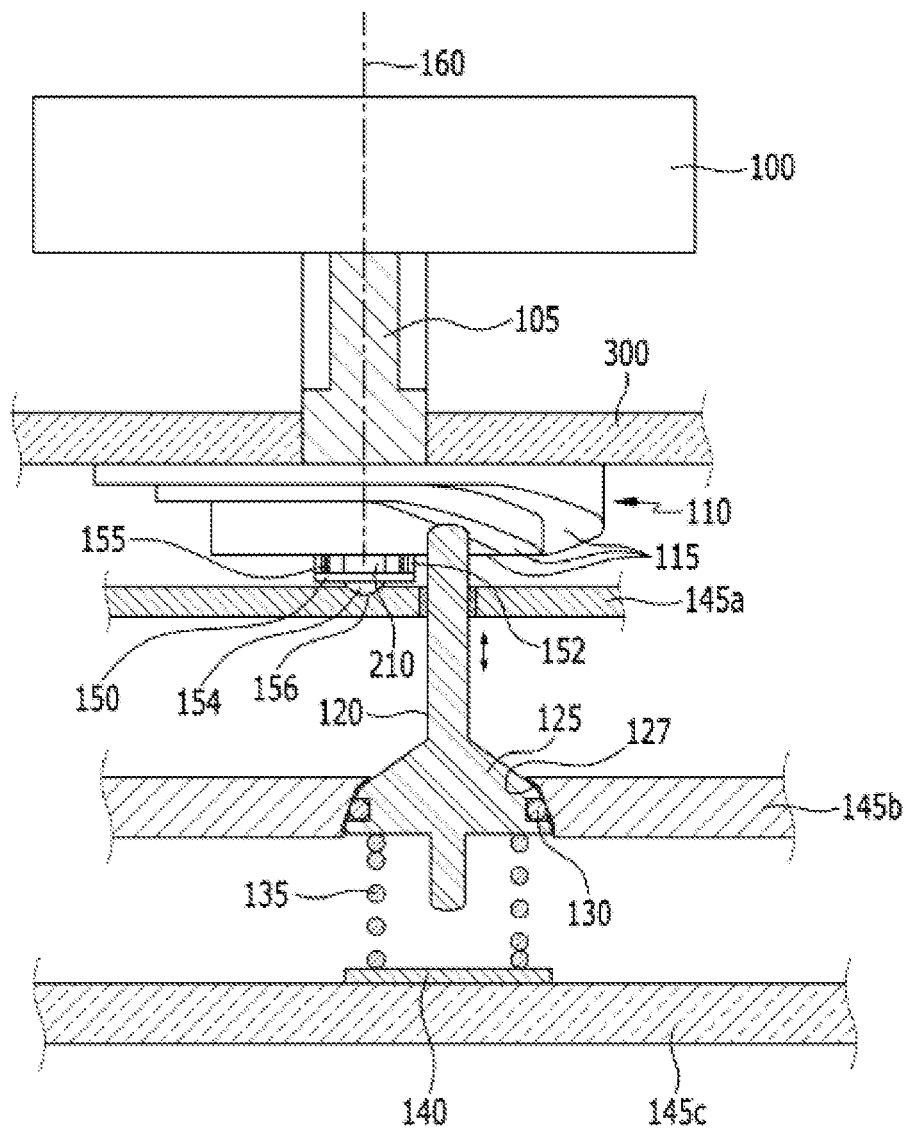
FIG. 1 is a cross-sectional view of a coolant control valve unit according to an exemplary embodiment of the present invention.

100: actuator
105: axle
110: cam
115: track
120: rod
125: valve
127: coolant path
130: sealing member
135: valve elastic member
140: holder
145a: upper member
145b: middle member
145c: lower member
150: plate
152: clip
154: protrusion
155: cam elastic member
156: protrusion groove
160: rotational axis
200: clip groove
210: insertion member
215: insert groove
300: cam cover

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to the accompanying drawings. However, since sizes and thicknesses of elements are shown at will for convenience of description, the present invention is not limited to the drawings without fail, but the thicknesses are enlarged for clearly expressing different parts and regions. The drawings and description are to be regarded as illustrative in nature and not restrictive, and like reference numerals designate like elements throughout the specification. In the following description, dividing names of components into first, second, and the like is to divide the names because the names of the components are the same, and an order thereof is not particularly limited.

FIG. 1 is a cross-sectional view of a coolant control valve unit according to an exemplary embodiment of the present invention. Referring to FIG. 1, a coolant control valve unit may include an actuator 100, an axle 105, a cam 110, a track 115, an insertion member 210, a cam elastic member 155, a plate 150, clips 152, a protrusion 154, a protrusion groove 156, a rod 120, a valve 125, a sealing member 130, a valve elastic member 135, a holder 140, a cam cover 300, an upper member 145a, a middle member 145b, and a lower member 145c. The actuator 100 may be operated by a controller.

The actuator 100 may be configured to rotate the cam 110 about a rotational axis 160 through the axle 105. The axle 105 may be configured to receive torque from the actuator 100. In addition, a top side of the cam 110 corresponds to the bottom side of the cam cover 300, and the axle 105 may be integrally formed with the cam 110 through an aperture of the cam cover 300. Three tracks 115 may be provided with a predetermined inclination and a predetermined height at an edge of the bottom side of the cam 110, excluding the rotational axis 160, and the tracks 115 may be formed in predetermined areas along a rotation direction of the rotational axis 160.

A rod 120 may be disposed to correspond to each of the tracks 115. Additionally, the rods 120 may be disposed in parallel with the rotational axis 160, and the valve 125 may be integrally disposed in a center portion of the rod 120. The rod 120 may extend upward from one side of the valve 125. In addition, an upper end of the rod 120 may correspond to the track 115. In particular, a plane of the track 115 may press the upper end of the rod 120 in a downward direction based on rotation of the cam 110. In addition, the valve elastic member 135 may support a bottom side of the valve 125, and the holder 140 may support a lower end of the valve elastic member 135.

An upper portion of the rod 120 penetrates the upper member 145a, the valve 125 may be configured to open or close a coolant path 127 formed in the middle member 145b, and the lower member 145c may support the holder 140. The upper member 145a, the middle member 145b, and the lower member 145c may be formed sequentially in a lower side of the cam 110. The plate 150 may be disposed at a central rotation portion in the bottom side of the cam 110, opposite ends of the plate 150 may be engaged to the bottom side of the cam 110 through the clips 152, and the cam elastic member 155 may be disposed between the top side of the plate 150 and the cam 110.

The protrusion 154 may be formed at a central portion in the bottom side of the plate 150, and the protrusion groove 156 where the protrusion 154 is received may be formed in the upper member 145a. In particular, the cam elastic member 155 may be configured to maintain a predetermined gap between the plate 150 and the bottom side of the cam 110. In addition, the coolant path 127 may be formed to have an interior diameter gradually decreased in an upward direction, and an exterior diameter of the valve 125 gradually decreased in an upward direction that corresponds to the shape of the coolant path 127 to prevent the valve 125 moving toward the track 115 while the valve 125 completely closes the coolant path 127. The sealing member 130 may be disposed between the valve 125 and the coolant path 127 to block leakage of the coolant while the coolant path 127 is closed by the valve 125. In the exemplary embodiment of the present invention, three tracks 115 are provided in a lower portion of the cam 110, and three rods 120 and three valves 125 may be correspondingly provided. However, the number of tracks, rods, and valves may be variously changed based on design specifications.

Figure 2:
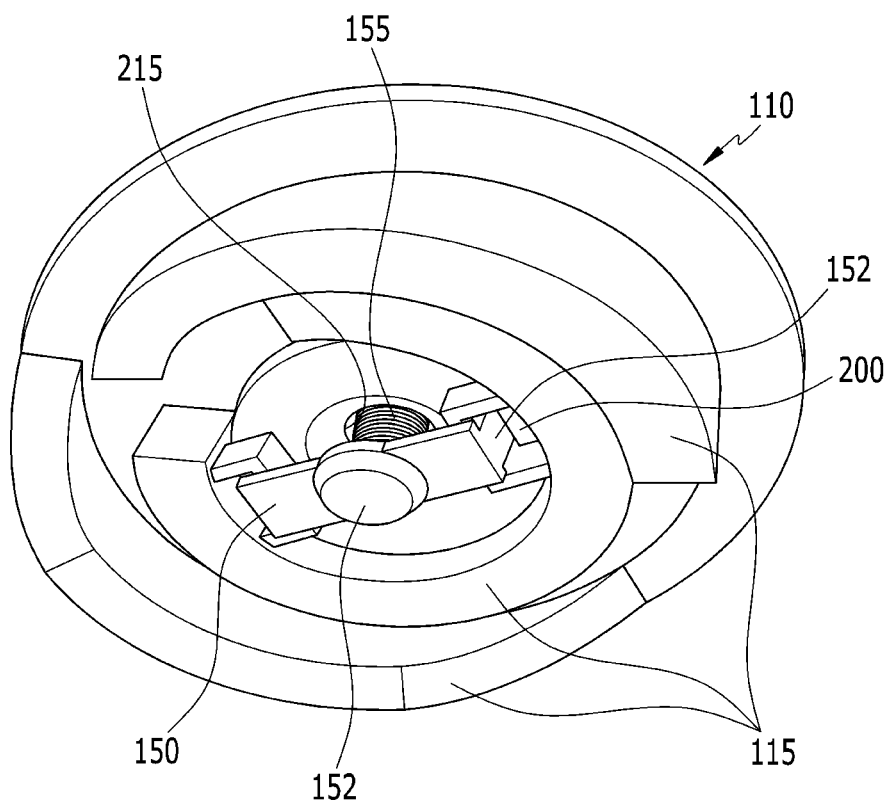
FIG. 2 is a perspective view of a bottom side of a cam of the coolant control valve unit according to the exemplary embodiment of the present invention.

FIG. 2 is a perspective view of the bottom side of the cam of the coolant control valve unit according to the exemplary embodiment of the present invention. Referring to FIG. 2, an insertion groove 215 may be formed in the bottom side of the cam 110 corresponding to the rotation axis, the insertion member 210 may be inserted into the insertion groove 215, the cam elastic member 155 may be inserted into the insertion groove 215, and the lower end of the cam elastic member 155 may be configured to elastically support the plate 150. The plurality of clips 152 may be formed upwardly at opposite ends of the plate 150, and the clips 152 may be fixed to the cam 110 by being inserted into clip grooves 200 formed in the bottom side of the cam 110. In addition, a convex protrusion 154 may be formed at a bottom center portion of the plate 150. The protrusion 154 and the insertion member 210 may be disposed at a location that corresponds to the rotation axis.

Figure 3:
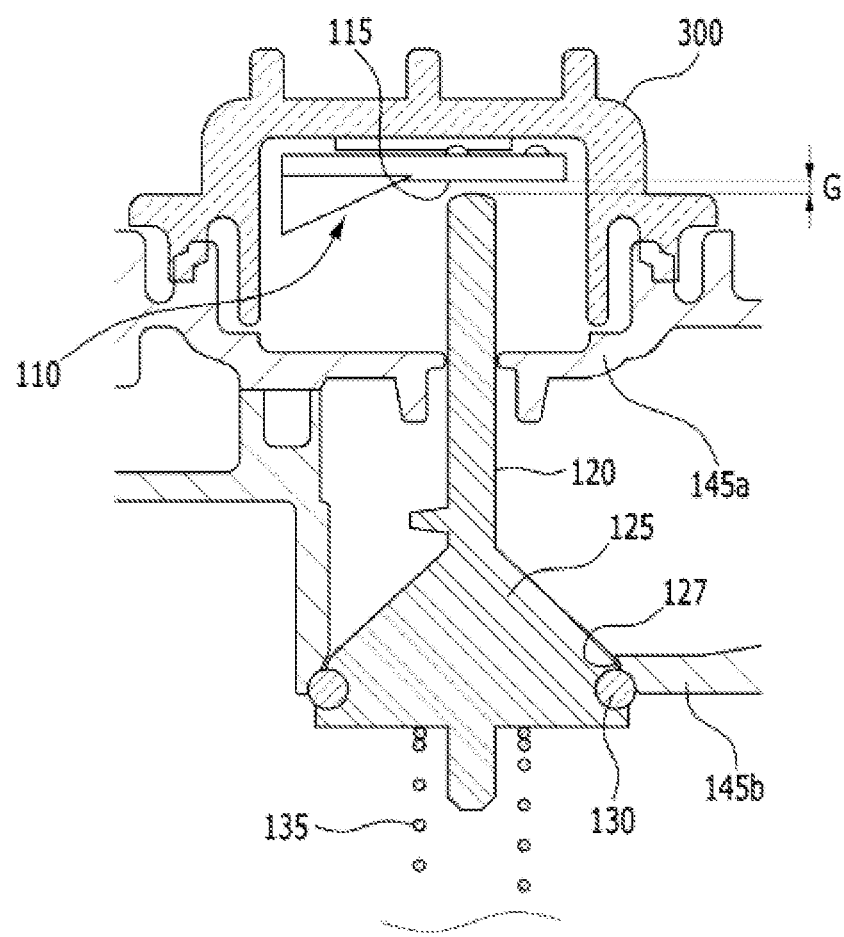
FIG. 3 is a cross-sectional view of a valve in a closed state in the coolant control valve unit according to the exemplary embodiment of the present invention.

FIG. 3 is a cross-sectional view of the coolant control valve unit in which the valve is in a closed state according to the exemplary embodiment of the present invention. Referring to FIG. 3, the cam cover 300 that supports the top side of the cam 110 may be fixed to the upper member 145a, and a gap G may be formed between the upper end of the rod 120 and the track 115 of the cam 110 while the coolant path 127 is closed by the valve 125. As the gap G is formed, friction abrasion of the rod 120 may be reduced, and thus, friction between the cap 110 and the rod 120 in an initial operation may be prevented in advance. The size of the gap G may be determined based on abrasion between the cam 110 and the track 115.

Figure 4:
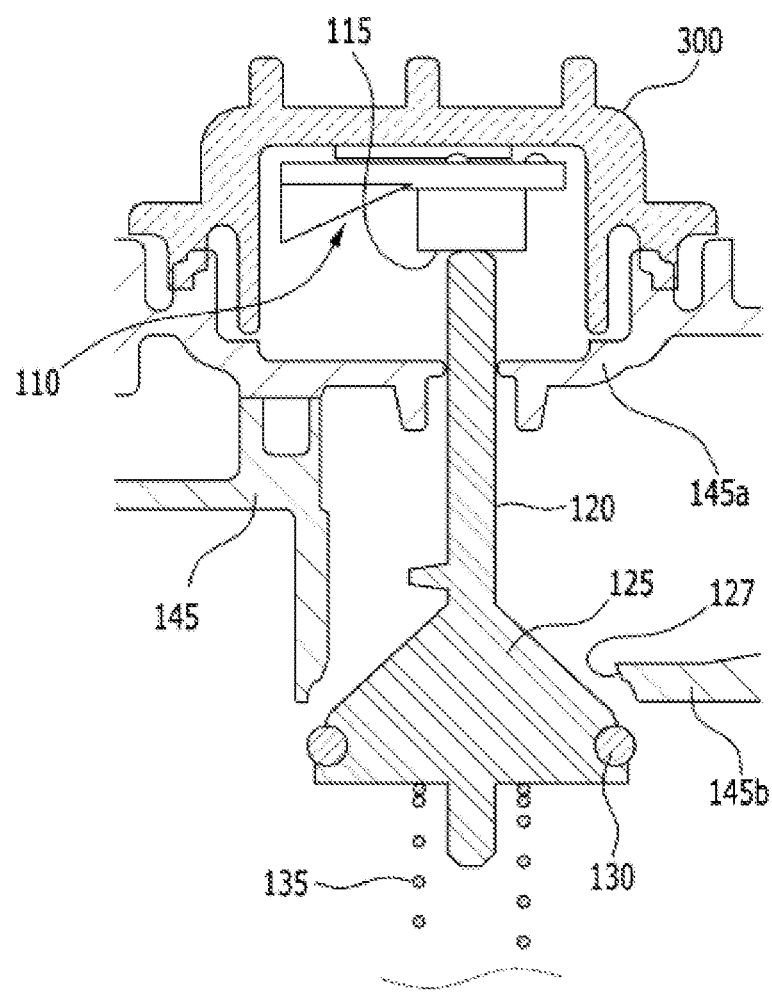
FIG. 4 is a cross-sectional view of the valve in a fully opened state in the coolant control valve unit according to the exemplary embodiment of the present invention.

FIG. 4 is a cross-sectional view of the coolant control valve unit of which the valve is fully opened according to the exemplary embodiment of the present invention. Referring to FIG. 4, when the cam 110 rotates by the operation of the actuator 100, the height of the track 115 of the cam 110 gradually ascends and thus, the upper end of the rod 120 may be pressed downward. In addition, when the height of the track 115 reaches a highest point, the valve 125 may be fully opened.

Figure 5:
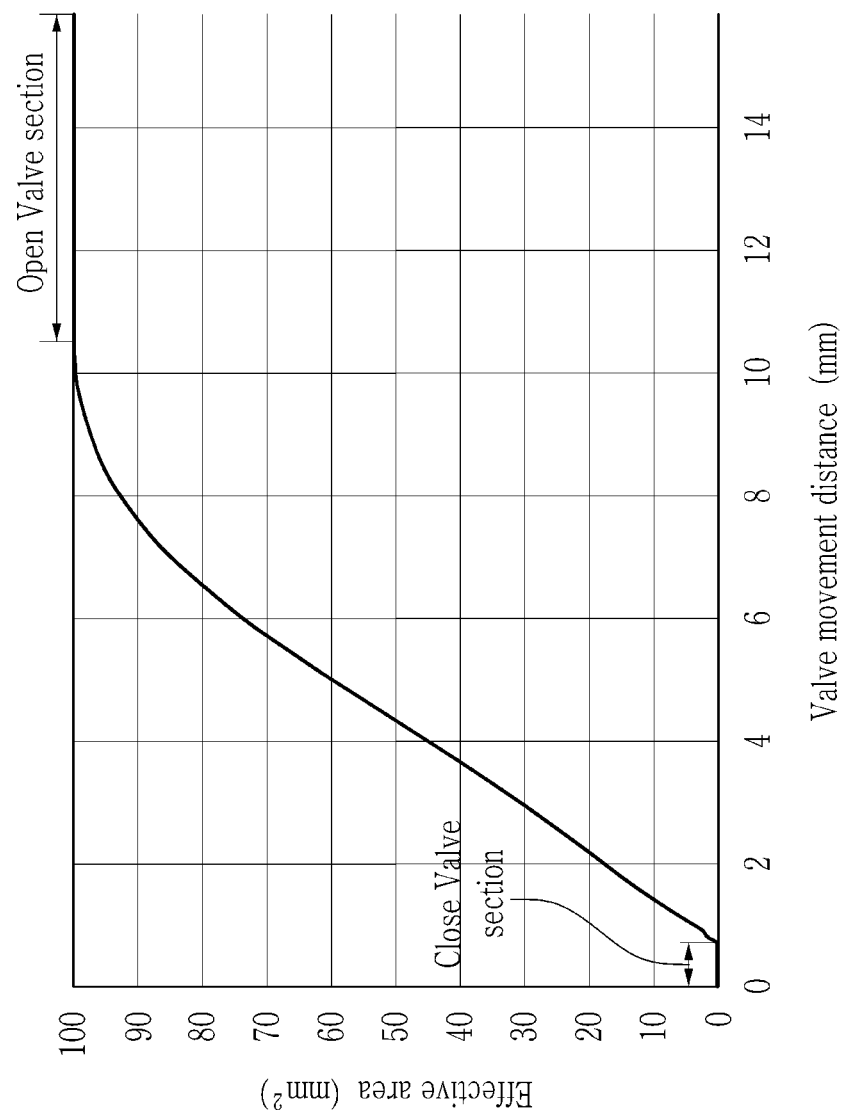
FIG. 5 is a graph that shows a degree of opening according to movement of the cam in the coolant control valve unit according to the exemplary embodiment of the present invention.

FIG. 5 is a graph that shows an opening degree of coolant control valve based on the movement of the cam according to the exemplary embodiment of the present invention. Referring to FIG. 5, the horizontal axis denotes a rotation location of the cam, and the vertical axis denotes an opening degree of the coolant path.

As shown in FIG. 5, a non-contact section may be formed within a predetermined region from an initial start point (i.e. 0) of the rotation location of the cam 110, and the rod 120 and the track 115 of the cam 110 do not contact each other in the non-contact section and thus, the opening degree of the coolant path 127 indicates zero. In addition, as the rotation location of the cam 110 is increased, the opening degree of the coolant path 127 is also increased, and the opening degree of the coolant path 127 reaches a predetermined maximum level (e.g., 100%) at a particular point. Then, the opening degree of the coolant path 127 may maintain the predetermined maximum level even though the rotation of the cam 110 increases.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A coolant control valve unit, comprising:
   a valve configured to open or close a coolant path;
   a rod extended from one side of the valve;
   a cam having a track formed with an inclination and a particular height along a rotation direction with respect to a rotation axis of the cam, wherein the track presses the rod based on the rotation of the cam;
   an actuator configured to rotate the cam about the rotation axis,
   wherein while the coolant path is closed by the valve, a gap is formed between the track and the rod, and
   wherein the cam rotates without contacting the rod by the gap until the cam rotates by a threshold angle;
   an upper member through which the rod penetrates;
   a plate engaged to a bottom side of the cam; and
   a cam elastic member configured to maintain the gap between the plate and the bottom side of the cam by being disposed between the plate and the bottom side of the cam.

2. The coolant control valve unit of claim 1, wherein as the gap is formed between the track and the rod, abrasion of the rod is reduced.

3. The coolant control valve unit of claim 1, further comprising:
   an axle integrally formed with the cam and configured to receive torque from the actuator.

4. The coolant control valve unit of claim 1, further comprising:
   a middle member disposed in a lower side of the upper member and where the coolant path is formed;
   a valve elastic member that supports the bottom side of the valve; and
   a holder that supports a lower end of the valve elastic member.

5. The coolant control valve unit of claim 4, wherein a plurality of clips formed at opposite ends of the plate are inserted into a clip groove formed in the bottom side of the cam.

6. The coolant control valve unit of claim 4, wherein a protrusion is formed at a corresponding location of the rotational axis in the bottom side of the plate, and a protrusion groove where the protrusion is received is formed in the upper member.

7. The coolant control valve unit of claim 4, wherein an insertion groove is formed corresponding to the rotational axis in the bottom side of the cam, and an insertion member is inserted into the insertion groove.

8. The coolant control valve unit of claim 1, wherein while the coolant path is closed by the valve, an interior diameter of the coolant path is gradually decreased toward the track to prevent further movement toward the track of the valve.

9. The coolant control valve unit of claim 8, wherein an exterior diameter of the valve is gradually decreased toward the track corresponding to the shape of the coolant path.

10. The coolant control valve unit of claim 8, further comprising:
   a sealing member disposed between the valve and the coolant path.

\* \* \* \* \*